United States Patent [19]

Smart

[11] Patent Number: 4,809,455
[45] Date of Patent: Mar. 7, 1989

[54] BAIT PACKAGE AND METHOD

[76] Inventor: Joseph H. Smart, 1925 Imperial St., Salt Lake City, Utah 84105

[21] Appl. No.: 39,712

[22] Filed: Apr. 20, 1987

[51] Int. Cl.$^4$ ............................................. A01K 97/02
[52] U.S. Cl. ..................................... 43/4.5; 43/44.99; 43/41; 43/44.2
[58] Field of Search ................... 43/4, 4.5, 41, 44.99, 43/100, 44.2

[56] References Cited

U.S. PATENT DOCUMENTS

| | | | |
|---|---|---|---|
| 1,787,908 | 1/1931 | Inami | 43/44.99 |
| 1,816,725 | 7/1931 | Freeman | 43/41 |
| 2,452,553 | 11/1948 | Curtis et al. | 43/44.99 X |
| 2,555,088 | 5/1951 | Irwin | 43/41 |
| 2,780,021 | 2/1957 | Fagg | 43/44.99 X |
| 2,827,376 | 3/1958 | Breuer | 43/44.99 X |
| 2,997,160 | 8/1961 | Marshall, Jr. | 43/44.99 X |
| 3,047,975 | 8/1962 | Pretorius | 43/44.2 X |
| 3,088,652 | 5/1963 | Berven | 43/44.99 X |
| 3,176,427 | 4/1965 | Hershey | 43/44.99 X |
| 4,554,756 | 11/1985 | Thomas | 43/44.2 X |
| 4,563,832 | 1/1986 | Drebot | 43/102 X |

FOREIGN PATENT DOCUMENTS 2267035 11/1975 France .

Primary Examiner—Nicholas P. Godici
Assistant Examiner—Carmine Cuda
Attorney, Agent, or Firm—Philip A. Mallinckrodt; Robert R. Mallinckrodt

[57] ABSTRACT

A bait package for wildlife comprises an odoriferous, effusive attractant material in an absorbent material therefor sealed within an easily puncturable container, which is placed at a desired location and punctured for use. For capturing marine life, such as edible crustaceans, e.g. crayfish, the attractant material may be a fish oil and the absorbent material either a usual bait formulation or an inexpensive, inedible, insoluble material, such as sawdust, and the bait package may be encased by an open weave material that catches the claws of the crustaceans. The bait package may also be covered with a porous material, such as a plastic foam sheeting, to protect the container and to aid diffusion of the attractant following puncture of the container. The open weave material encasing the bait package is preferably a reusable case of special formation.

4 Claims, 1 Drawing Sheet

BAIT PACKAGE AND METHOD

BACKGROUND OF THE INVENTION

1. Field:

The invention has to do with bait for attracting marine life, animals, and other wild living creatures to locations for capture, killing, or for performing a useful service, such as is done by bees or other insects in pollinating plant life. It also has to do with methods of storing smelly bait against loss of odor until used and of releasing the odor in small increments during use.

2. State of the Art:

Apart from the usual recreational catching of fish and other marine life, such as crustaceans, by individuals for sport, commercial fishermen, lobstermen, crabbers, crayfishers, etc. make extensive use of bait formulations containing attractants to draw the intended victims to traps therefor or to locations for netting or for other methods of capture or disposal. Such bait formulations typically take the form of edible matter, such as alfalfa or cottonseed meal, and a binder, such as wheat middlings, mixed with weighty inedible matter, such as sand, an attractant, such as fish oil, and water to form a dough, which is compressed into pellets or bricks and dried. When the so-compressed bait dissolves, as it does in the course of a few hours of being submerged in water during use, the attractant is dissipated so that the bait is no longer useful and requires replacing by fresh bait.

Such bait is not packaged for use, although for catching crustaceans it is often placed in net or other porous bags which will be engaged by the claws of the crustaceans seeking to devour the bait. Here, the bait is subject to rapid dissolution in much the same way it is when loosely placed in a trap.

SUMMARY OF THE INVENTION

It is a principal objective of the present invention to protect the bait against dissipation of the attractant into the atmosphere as an unpleasant odor during marketing or storage of the bait and against undue dissipation of the attractant during use of the bait.

This is accomplished by packaging individual portions of the bait for marketing, storage, and use in impervious but easily puncturable containers, such as the peripherally sealed, laminated, aluminum foil or plastic film envelopes currently used in the packaging of individual portions of catsup, mustard, salad dressing, etc. for consumption by humans, and by the user puncturing the envelope, usually at several locations, immediately prior to use of the entire package as the bait. This is especially applicable to short term recreational use by individuals, as in fishing for crayfish.

A further objective is to provide for extended life of the bait package after exhaustion of the attractant contained in the original bait mix, especially for long term use as in traps by commercial fishermen.

This is accomplished by including in the so-packaged bait, at least one smaller, impervious, easily puncturable container filled with a replenishment supply of the attractant. Such inner container is or containers are punctured by the user at a later time when replenishment of the attractant is required.

The bait formulation can be either compressed as usual, or not, since it is largely protected by the impervious container during use after puncturing.

Although both outer and inner containers are advantageously of the type previously indicated, a variety of materials and shapes having the required characteristics may be employed in the packaging of the bait. The important thing is that the odor of the attractant be confined until puncture of the container concerned. Thus, soft plastic bottles or collapsible tubes, effectively sealed closed, also may be used.

If the so-packaged bait is to be used in traps submerged in water, as for crustaceans, it may be tied to the floor of the trap or held in place by a hinged-cover forming part of the trap. If it is to be used in drop-line fishing, the envelope or other form of container is covered by an open weave material, such as burlap or a plastic mesh or net material, which provides a hold for the crustaceans' claws. This material is advantageously formed as a reusable case into which the so-packaged bait is inserted and which is provided with means, such as grommets or ties, for attachment to a drop-line. The encased packages may also be fastened to the bottom of, or otherwise placed in, traps.

Since in the bait package of the invention, the conventional bait material serves primarily as an absorbent and carrier for the attractant, any porous substance may be substituted for the conventional bait material. Thus, sawdust, ground sugarcane bagasse, or other finely divided, insoluble, cellulosic material, for example, may be substituted for the more expensive edible bait material.

THE DRAWING

The illustrated embodiments of the invention represent the best mode presently contemplated for carrying it out in actual practice.

In the drawing:

FIG. 1 is a perspective view of a short-term, crustacean bait package of the invention adapted to be tied to a drop-line, a portion being broken out to show otherwise hidden parts in transverse vertical section;

FIG. 2, a transverse section taken on the line 2—2 of FIG. 1 and drawn to a larger scale;

FIG. 3, a view in longitudinal elevation, partly in section, through a usual crustacean trap in which a long-term crustacean bait package, having a single, inner, reserve envelope of attractant, is secured, the view being drawn to a smaller scale and the bait package being shown in elevation; and FIG. 4, a transverse section taken on the line 4—4 of FIG. 3 and drawn to the scale of FIG. 2.

DETAILED DESCRIPTION OF ILLUSTRATED EMBODIMENTS

Figure 1:
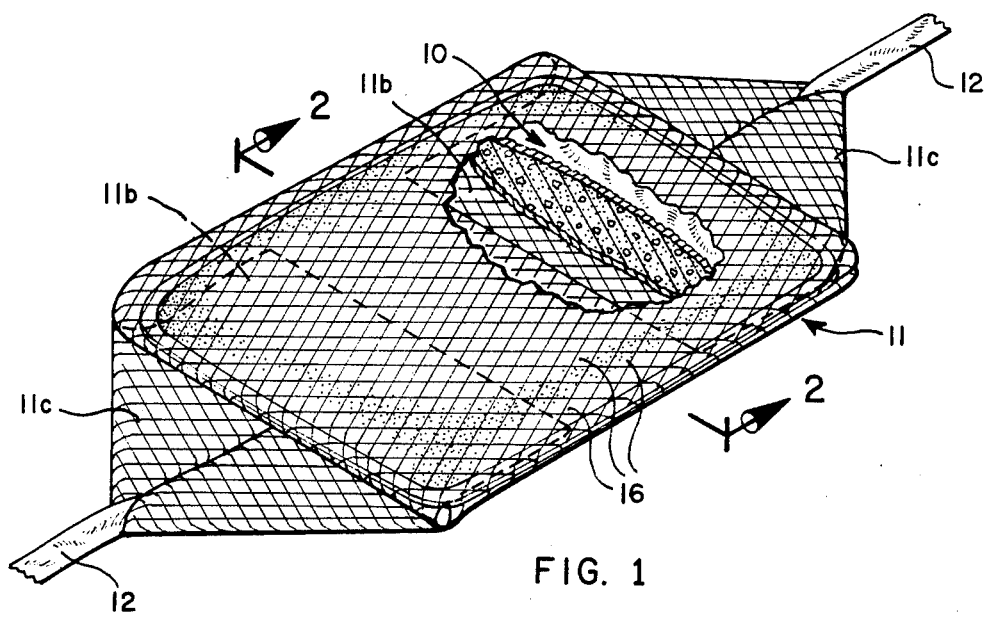
Figure 2:
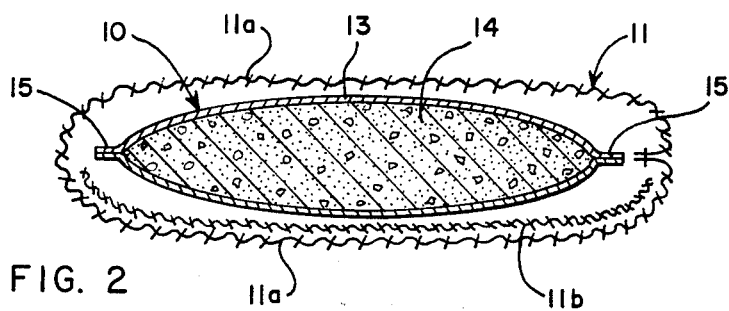

In the form illustrated by FIGS. 1 and 2, a bait package 10 of the invention is inserted within an open weave case 11, here shown of plastic net material which is provided with ties 12 for attachment to a drop-line for use in fishing for crustaceans, such as crawfish, by an individual fisherman on a short-term basis, or to a trap within which it may be placed for commercial fishing on a long-term basis.

The bait package 10 comprises an impervious, sealed, but easily puncturable, container 13 containing a bait formulation 14 which includes an odoriferous, effusive attractant. The container 13 is advantageously a laminated aluminum foil or plastic film envelope that has been sealed about its peripheral margins, as at 15, into sealed-closed bag formation against escape of odor and entry of water into which it is put during use.

In this instance, the bait 14 is of the type used for crustaceans and may be of customary formulation or an inexpensive, inedible, absorbent material substituted for the absorbent edible material ordinarily employed. Case 11 may be of any open weave and preferably flexible material, but is desirably a plastic net material, through the openings 16 of which a sharp instrument can be passed to puncture envelope 13 at a number of locations insuring effective effusion of the attractant into the surrounding water. Case 11 is provided with an opening or openings, through which the bait package is inserted and replaced when necessary, and with the means for attachment to a drop-line or to a trap. It is preferred that case 11 be open at oposite ends and have opposite, broad, panel walls 11a, respectively, one of which has tuck-in flap extensions 11b, respectively, at its opposite ends and the other of which has extensions 11c, respectively, that are advantageously made triangular by folding the extended material upon itself and stitching into position, to which are secured the attachment means, e.g. grommets, or preferably the ties 12 secured by the stitching.

Although the use of a sealed aluminum foil or plastic film envelope as the impervious but easily puncturable container of the invention is desireable as providing for economical mass production of the bait packages, other easily penetratable containers may be used, for example, soft plastic bottles or collapsible tubes.

Immediately prior to use of the aforedescribed bait package, envelope 13 is punctured at several locations that are placed to ensure effective diffusion of the attractant component into the surrounding water.

Figure 3:
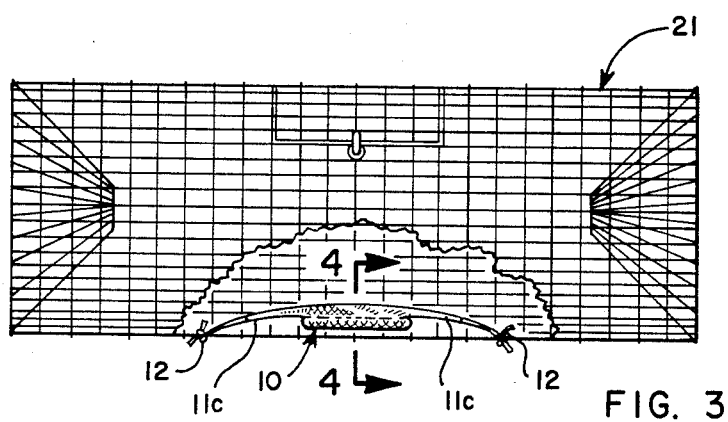
Figure 4:
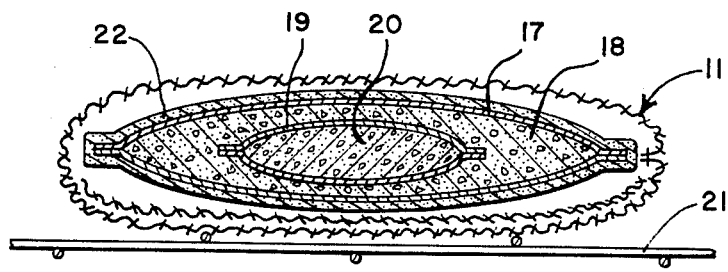

For long-term commercial use, as in traps for crustaceans, reserve attractant is similarly sealed into one or more easily puncturable containers smaller than that of the main container and one or more of these are sealed into the main container along with the bait therein. Thus, as shown in FIGS. 3 and 4, a main envelope 17 contains bait 18 and a smaller envelope 19 filled with reserve attractant 20. Main envelope 17, with its contents, is placed in a net case 11 which is secured by the ties 12 to the bottom or other part of a conventional trap 21 and is punctured by use of a sharp instrument passing through the net openings. It is perferred to place the case on the bottom of the trap with the panel wall that is provided with the triangular extensions 11c uppermost, so such triangular extensions securely close the end openings when ties 12 are tied to the bottom of the trap.

The loose weave or net material forming case 11 is relatively indestructable, and such case can be used over and over again. The puncturable containers, however, are disposable after use.

As illustrated in FIGS. 3 and 4, it may be desirable in some instances to place a protective covering, 22, over the bait package before it is placed in the case. This can be done also for a bait package not intended to be encased. For use in an aqueous environment, the covering is a water insoluble, porous material, such as a wrapping of a thin sheet of foam plastic, which will not only protect the container against inadvertant puncture during storage or marketing but which will also aid in diffusing the attractant following puncture.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A bait package, comprising a sealed, impervious but easily puncturable container; an odoriferous, effusive attractant; a mass of attractant-absorbent material within said container by which said attractant has been absorbed; and at least one smaller, sealed, impervious but easily puncturable container within said first-named container, said smaller container containing a replenishment supply of the attractant.

2. A method of attracting wildlife to a given location, comprising securing a bait package that is in accordance with claim 1 in a retrievable manner as bait for wildlife; puncturing the first-named container of said bait package to permit effusion of the attractant exteriorly of said container; and puncturing one or more of the smaller containers within said first-named container to permit effusion of attractant therefrom into the absorbent material within said first-named container.

3. A bait package according to claim 1, wherein the first-named container is encased by an open weave material.

4. A bait package according to claim 3, wherein the open weave material is formed as a reusable case for the container, said case having open ends provided with respective insert flaps for retaining the bait package and with respective extensions to which are secured means for attachment to a drop-line or a trap.

* * * * *